(12) United States Patent
Karode et al.

(10) Patent No.: US 11,992,804 B2
(45) Date of Patent: May 28, 2024

(54) INTEGRATED COMPRESSION AND MEMBRANE SEPARATION PROCESS FOR REMOVAL OF CO2 FROM RAW NATURAL GAS

(71) Applicants: L'Air Liquide, Societe Anonyme pour l'Etude et l'Exploitation des Procedes Georges Claude, Paris (FR); Air Liquide Advanced Technologies U.S. LLC, Houston, TX (US)

(72) Inventors: Sandeep Karode, Boothwyn, PA (US); Paul Terrien, Syracuse, NY (US); Cyril Defaye, Champigny-sur-Mar (FR)

(73) Assignees: L'Air Liquide, Societe Anonyme Pour l'Etude et l'Exploitation des Procedes Georges Claude, Paris (FR); Air Liquide Advanced Technologies U.S. LLC, Houston, TX (US)

( * ) Notice: Subject to any disclaimer, the term of this patent is extended or adjusted under 35 U.S.C. 154(b) by 219 days.

(21) Appl. No.: 17/567,033

(22) Filed: Dec. 31, 2021

(65) Prior Publication Data

US 2023/0211281 A1 Jul. 6, 2023

(51) Int. Cl.
*B01D 53/22* (2006.01)
*C10L 3/10* (2006.01)

(52) U.S. Cl.
CPC ............ *B01D 53/226* (2013.01); *C10L 3/104* (2013.01); *C10L 2290/548* (2013.01)

(58) Field of Classification Search
CPC .. B01D 53/22; C10L 3/10; C07C 7/00; C07C 7/144
See application file for complete search history.

(56) References Cited

U.S. PATENT DOCUMENTS

| | | | |
|---|---|---|---|
| 5,435,836 A | 7/1995 | Anand et al. | |
| 6,630,011 B1* | 10/2003 | Baker | B01D 53/225 95/47 |
| 8,211,211 B1* | 7/2012 | Knaebel | B01D 53/75 95/96 |
| 8,999,038 B2* | 4/2015 | Ungerank | B01D 53/226 95/51 |
| 10,561,978 B2 | 2/2020 | Jensvold et al. | |
| 2004/0103782 A1 | 6/2004 | Wascheck et al. | |
| 2017/0283292 A1* | 10/2017 | Kim | C02F 11/04 |
| 2019/0224617 A1* | 7/2019 | Mitariten | C07C 7/005 |

FOREIGN PATENT DOCUMENTS

| | | |
|---|---|---|
| EP | 0 778 069 | 12/1996 |
| EP | 0 853 970 | 7/1998 |
| EP | 3 695 897 | 8/2020 |

* cited by examiner

*Primary Examiner* — Youngsul Jeong
(74) *Attorney, Agent, or Firm* — Elwood L. Haynes

(57) ABSTRACT

A single compressor is used to separately compress permeate from cascaded first and second gas separation membrane-based separation units and residue from a fourth gas separation membrane-based separation unit in order to avoid too high a CO2 partial pressure in the compressed permeate. After the permeates from the first and second stages are compressed, the compressed stream is fed to a third gas separation membrane-based separation unit.

6 Claims, 4 Drawing Sheets

INTEGRATED COMPRESSION AND MEMBRANE SEPARATION PROCESS FOR REMOVAL OF CO2 FROM RAW NATURAL GAS

CROSS-REFERENCE TO RELATED APPLICATIONS

None.

BACKGROUND

Field of the Invention

The present invention relates to removal of $CO_2$ from treated natural gas with integration of compression and membrane separation.

Related Art

Gas separation membranes are used to separate mixtures of carbon dioxide ($CO_2$) and hydrocarbons in order to enrich heating value of raw natural gas. More specifically, amounts of $CO_2$ are removed from the treated natural gas and the methane-enriched product is blended with the treated natural gas. A recent trend has been to treated natural gas having relatively high amounts of $CO_2$ content (i.e., upwards of 20 mol %) with an objective of enriching the removed $CO_2$ streams to relatively high purity (i.e., upwards of 90 mol %) while at the same time minimizing hydrocarbon losses.

These aforementioned process constraints drive the process towards a two-stage cascade recycle system as shown in FIG. 1. The first stage membrane processes the feed stream 105 (made up of the treated natural gas stream 101 and the recycled second stage permeate stream 103) to produce a higher pressure residue stream 109 (which is typically the product stream) and a lower pressure permeate stream 111 which contains the removed $CO_2$ and any hydrocarbons that slip along with the $CO_2$. The first stage permeate stream 111 is typically compressed at a compressor 113 to a high enough pressure so that the compressed first stage permeate stream 115 may be satisfactorily processed in a second membrane stage 117. The lower pressure permeate 119 from the second stage is usually the process off-gas and is processed separately in a fuel header system. The higher pressure residue stream 103 is recycled towards the first stage membrane 107 and blended with the incoming treated natural gas stream 101 in order to make feed stream 105.

Usually, the compressor for compressing the first stage permeate stream 111 is chosen such that there is sufficient excess pressure in the second residue stream 103 to enable it to be blended with the treated natural gas stream 101. However, this poses a problem when the $CO_2$ content in the first stage permeate stream 111 is sufficiently high and the resulting $CO_2$ partial pressure of the first stage permeate stream 111 exceeds the design limits of the membrane elements in the second stage 117. In such a scenario and as illustrated in FIG. 2, the obvious solution is to split the compression duties between the compressor 113 for compressing the first stage permeate 111 and an additional compressor 122 for compressing the second stage residue stream 120 prior to it being recycled towards the first stage 207, as stream 103, in order to manage the partial pressure limit for the membrane elements in the second stage 117. Using two separate compressors 113, 120 is typically very expensive and ordinarily makes a project economically prohibitive.

Thus, there is a need for an improved method and system for removal of CO2 from CO2/hydrocarbons mixtures that does not suffer from the problems associated with conventional gas separation membrane-based separations schemes.

SUMMARY

There is disclosed a method of removing amounts of CO2 from CO2/hydrocarbon mixtures, said method comprising the steps of: feeding a feed stream, comprising CO2 and hydrocarbons, to a first gas separation membrane-based separation unit comprising one or more banks of one or more membranes arranged in parallel or in series that are selective for $CO_2$ over methane to produce, in comparison to a CO2 content of the first feed stream, a first CO2-enriched permeate stream and a first CO2-deficient residue stream; withdrawing the first residue stream from the first separation as product natural gas; compressing the first permeate in one or more compressors of a multi-stage compression unit comprising a plurality of compressors arranged in series to produce a compressed stream of the first permeate; feeding the compressed stream of the first permeate to a second gas separation membrane-based separation unit comprising one or more banks of one or more membranes arranged in parallel or in series that are selective for CO2 over methane to produce, in comparison to the compressed stream of the first permeate, a second CO2-enriched permeate stream and a second CO2-deficient residue stream; compressing the second residue stream in one or more compressors of the multi-stage compression unit to produce a compressed second residue stream, the one or more compressors used to compress the first permeate being different from the one or more compressors used to compress the second residue stream; feeding the compressed second residue stream to a third gas separation membrane-based separation unit comprising one or banks of one or more membranes that are selective for CO2 over methane to produce, in comparison to the second CO2-deficient residue stream, a third CO2-enriched permeate stream and a third CO2-deficient residue stream; withdrawing the second and third permeate streams as one or more streams of product CO2; and combining the third CO2-deficient residue stream with a stream of a mixture of CO2 and hydrocarbons, to produce the feed stream, the mixture of CO2 and hydrocarbons including methane.

The above-disclosed method may include one or more of the following aspects:

the stream of a mixture of CO2 and hydrocarbons is raw natural gas that has been partially treated.

a pressure of the stream of a mixture of CO2 and hydrocarbons ranges from 30-100 bar.

the stream of a mixture of CO2 and hydrocarbons comprises 30-80 mol % CO2.

the product natural gas comprises at most 20 mol % CO2.

the one or more compressors are driven with a single drive.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
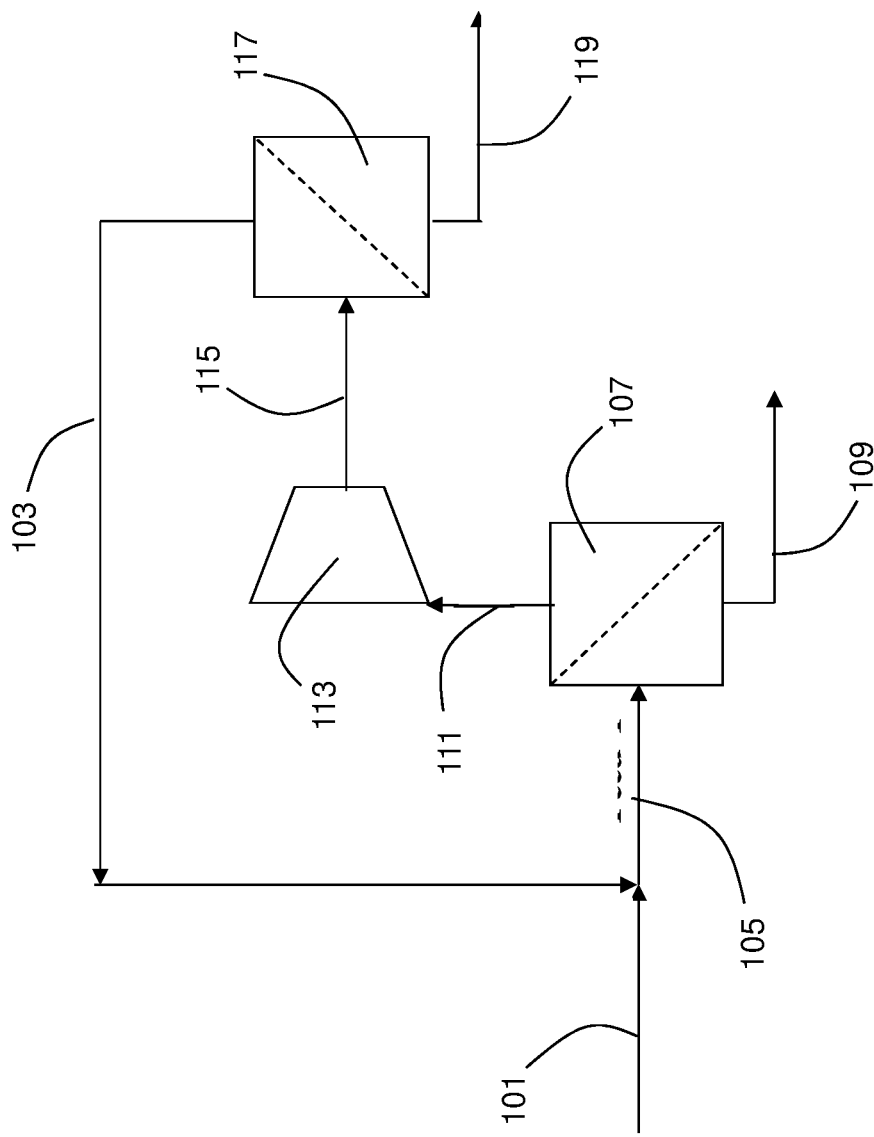
FIG. 1 is a schematic of a prior art two-stage scheme for removal of CO2 from treated natural gas.
Figure 2:
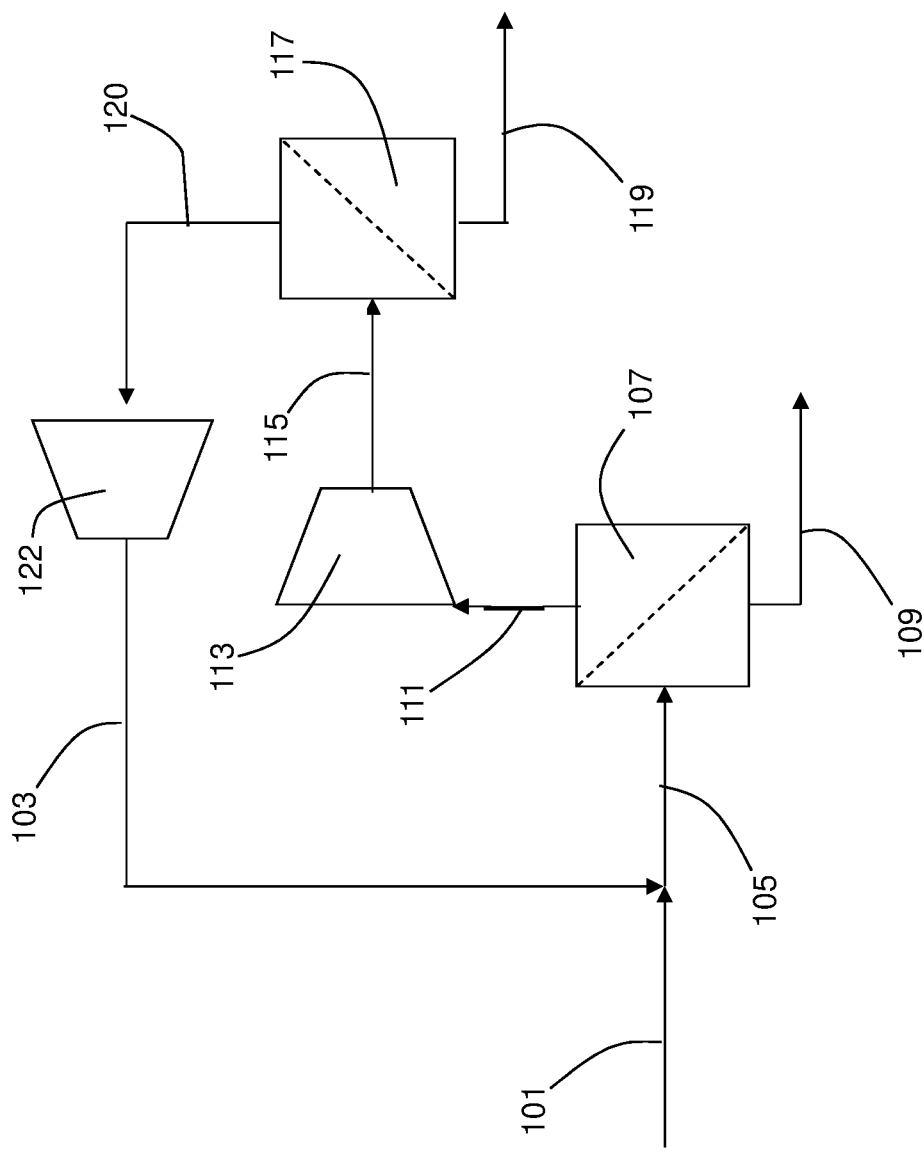
FIG. 2 is a schematic of another prior art two-stage scheme for removal of CO2 from treated natural gas.

We have invented a method and system for removal of CO2 from a mixture of CO2 and hydrocarbons (that includes methane) that produces product natural gas and product CO2 while at the same time avoiding plasticization of membrane units. We propose a three-stage separation scheme, based upon gas separation membranes, that uses a single compressor.

While the proportions of CO2 and hydrocarbon in the mixture of CO2 and hydrocarbon will vary depending upon the type of gas mixture (i.e., raw natural gas, partially treated natural gas, landfill gas, and digester gas), in one embodiment (e.g., raw natural gas or partially treated natural gas), the mixture of CO2 and hydrocarbon may comprises 30-80 mol % CO2, 10-70 mol % methane, and lesser amounts of other components and impurities. Typically, the feed stream has a pressure of 30-100 bar.

The product natural gas typically has a CO2 content of at most 20 mol %, more typically, at most 15 mol %, or even as low as 2 mol %. It typically has a pressure of 30-100 bar.

Each of the separation stages includes one or more banks of membranes arranged in series or in parallel. For a bank that includes more than one membrane, we mean that, each of the membranes for such a bank are fed, in parallel, with a gas to be separated. This may be accomplished through use of known techniques, including feeding the gas to be separated to a manifold that evenly divides up the flow amongst each of the membranes in that bank. When a given separation stage has two banks in parallel, that means that both banks are fed, in parallel, with a gas to be separated. When a given separation stage has two banks in series, that means that membrane of the first bank is fed with a gas to be separated (or in the case of a first bank including more than one membrane, each of the membranes of the first bank is fed, in parallel, with the gas to be separated). A separation stage having two banks in series also means that the membrane of the second bank is fed with a residue stream from the first bank (or in the case of a second bank including more than one membrane, each of the membranes of the second bank are fed, in parallel, with the residue stream from the first bank. One of ordinary skill in the art will recognize that this same concept can be scaled to three, four, or even more banks in series.

In the invention, the first gas separation membrane-based separation stage may have a single bank of membranes, two or more banks of membranes arranged in parallel, or two or more banks of membranes arranged in series. Similarly, the second gas separation membrane-based separation stage may have a single bank of membranes, two or more banks of membranes arranged in parallel, or two or more banks of membranes arranged in series.

Each of the membranes of the first, second, and third stages is selective for CO2 over methane. This means that the CO2 in the gas fed that is fed to the membrane will enrich on a lower pressure permeate side of the membranes while the methane in the fed gas will enrich on a higher pressure residue side of the membrane. The membranes within a given bank may be the same as or different from one another, but typically are the same. the membranes within a given separation unit may be the same as or different from one another, but typically are the same. The membranes of one separation unit may be the same as or different from those of one or more of the other separation units, but typically are the same.

The first separation stage is a feed stage that produces a first permeate stream and a first residue stream. The first residue stream is withdrawn as product natural gas. After being compressed by one or more compressors in a multi-stage compression unit, the first permeate stream is fed to the second separation stage which produces a second permeate stream and a second residue stream. After being compressed by one or more compressors of the multi-stage compression unit, the second residue stream is fed to the third separation stage. The compressors used to compress the first permeate stream are different from the compressors used to compress the second residue stream, even though they form part of the same multi-stage compression unit. The third separation unit produces a third permeate stream and a third residue stream. The second and third permeate streams are withdrawn as a high CO2 content stream constituting CO2 product gas, and optionally, may be further purified in downstream processing according to methods well known in the field gas CO2 purification technology. The third residue stream is combined with the mixture of CO2 and hydrocarbons to form a feed gas that is fed to the first separation unit.

Because the first permeate stream has been compressed, a sufficient driving force is realized in the second separation stage. However, the first permeate stream is not compressed to so high a pressure that the CO2 partial pressure of the first permeate stream causes plasticization in the second separation unit receiving such a first permeate stream. The undesirable effects of membrane plasticization by relatively high CO2 partial pressures is well known. At the same time, the second residue stream is compressed, prior to being fed to the third separation unit, to a pressure sufficient to result in a pressure of the third residue stream that allows the third residue stream to be blended with the mixture of CO2 and hydrocarbons without further compression thereof. Because all of the compression is performed with a single multi-stage compression unit, implementation of the invention is more economical than conventional methods.

We will now proceed with a description of two embodiments of the invention.

Figure 3:
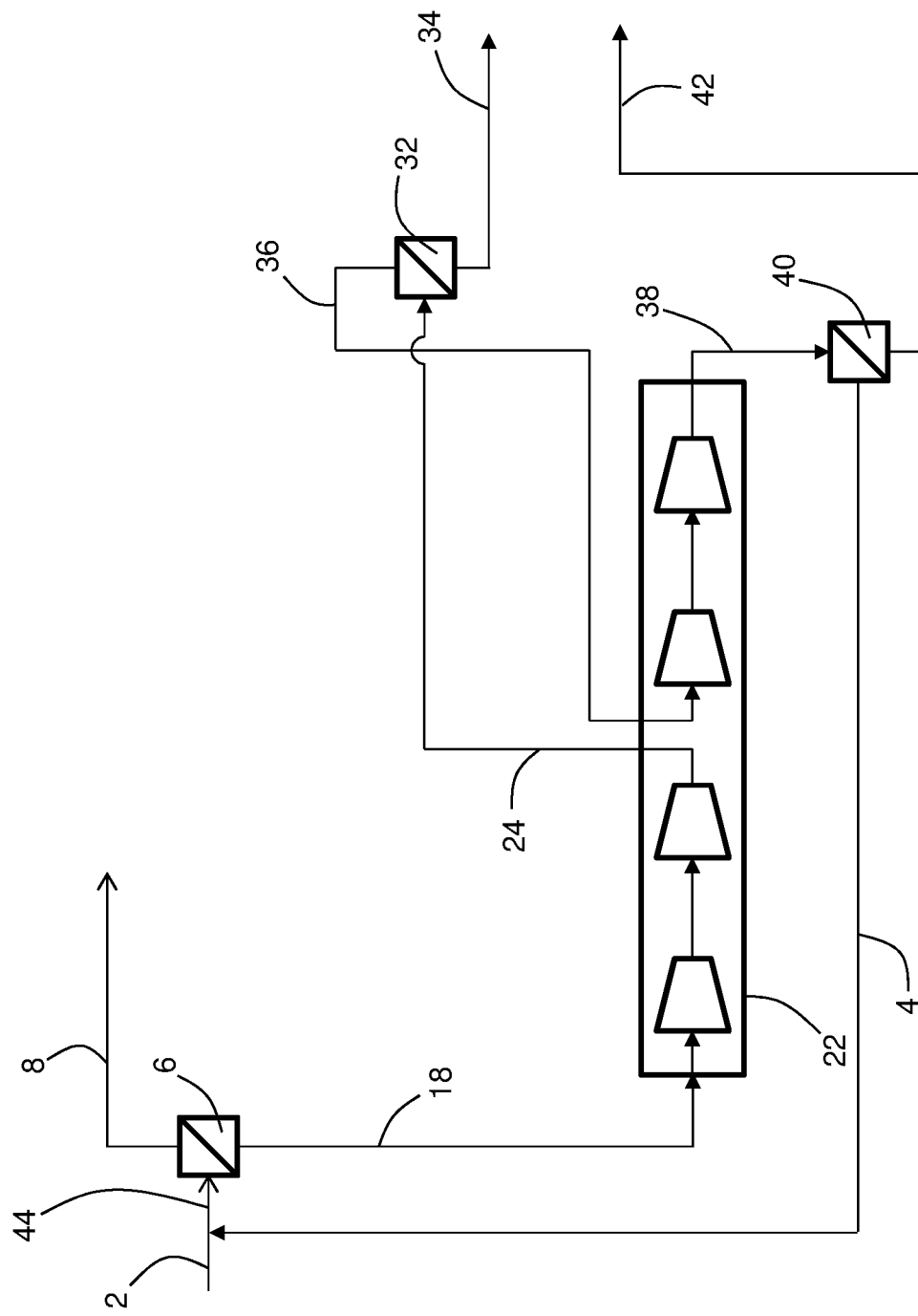
FIG. 3 is a schematic of an embodiment of the invention in which a single compressor is used to separately compress permeate from a first stage and retentate from a second stage.

In a first embodiment illustrated in FIG. 3, a feed stream 44 is in part derived from a stream of a mixture of CO2 and methane 2. The feed stream 44 is fed to a first gas separation membrane-based separation stage 6, which includes a bank of one or more membranes that are selective for CO2 over methane. In comparison to the feed stream 44, the first stage 6 produces a first, CO2-enriched and methane-deficient permeate stream 18 and a first, CO2-deficient and methane-enriched residue stream 8. The first residue stream 8 is be withdrawn as product natural gas and may be optionally further treated to remove remaining impurities.

The first permeate streams 18 is compressed in one or more compressors of a multi-stage compression unit 22 that includes a plurality of compressor stages arranged in series. For centrifugal compression-type compression units, typically there are 4 or 5 or 6 compressor stages arranged in series. For reciprocating-type compression units or screw-driven compression units, there may be 3-6 compressor stages arranged in series.

According to the invention, we have modified the use of an otherwise-conventional compression train so that it can be used to separately compress two different gases. Those skilled in the art will recognize that compression trains are typically used to compress a gas in each of the sequential compressors from low to medium to high pressure. For example, in a conventional 4-compressor compression unit, gas is sequentially compressed by the upstream-most compressor to a low pressure, compressed by the next upstream-most compressor to a moderately low pressure, compressed by the next upstream-most compressor to a moderate high pressure, and compressed by the downstream-most compressor to a high pressure.

Allow us to provide a contrasting example in practice of the invention while applying the invention to the above-described 4-compressor compression unit example. In practice of the invention, the first permeate stream 18 would be sequentially compressed to a low pressure by the first compressor and this moderately low pressure gas is then fed to the second compressor where it is compressed to moderately low pressure using the second compressor. Instead of feeding the moderately low pressure gas to the third compressor and compressing it to a moderately high pressure (and thereafter to a high pressure with the fourth compressor), the moderately low pressure gas is instead subjected to a membrane purification process (described below) before the methane-enriched gas resulting from that membrane purification process is returned to the compression unit 22 and sequentially compressed by the third and fourth compressors.

According to this invention, the compression train can actually be integrated on a single machine using, for example, a single driver using an integrally geared centrifugal compressor, a reciprocating compressor, or an inline centrifugal compressor.

In a compression train implementing integrally geared centrifugal compressors, the compression stages are independent so that each stage is in a dedicated casing and all of the stages are driven by a single gearbox. Given the moderately high molecular weight of the gas to be compressed, up to 10 stages may be used, each with a pressure ratio of at least 2.2. This type of structure allows independent management of each flow and variations in stage cut on the intermediate membrane. This is done by having dedicated Inlet Guide Vanes (IGVs) on each process section of compression stages utilized to compress a particular gas (i.e., the first permeate and the second residue. Such a scheme allows relative easy adjustment of the pressures to which each gas is compressed to Similar to the compression train utilizing compressors of the integrally geared centrifugal type, each cylinder of a reciprocating compressor is independent. But in this case, the functions of the inlet guide vanes are instead served by flow control device such as stepless decides, unloaders, and variable clearance pockets. Typical compression ratios should be at least 3 in this case, but there will still be some flexibility to adjust the pressure of the compressed gases. One benefit of this technology is an extreme flexibility at high efficiency.

In a compression train using inline compressor centrifugal compressor, the casings are not independent. Thus, while this integration can be done, there is the potential for leaks between stages. This is deemed acceptable for applications that are not so sensitive to leaks, such as membrane applications. Additionally, inline compressor centrifugal compressor-type compression trains may be quite suitable for very large flow rates.

Because it is more desirable to collect the product CO2 at relatively higher pressures without requiring further compressors, it is advantageous to provide a suitably high pressure for the compressed first permeate stream 24 before it is further separated in any downstream gas separation membrane stages. Thus, the resulting pressure of the stream 24 of the compressed first permeate is typically 15-50 bar. Because the first permeate has a CO2 content of 40-95 mol % CO2, the compressed first permeate stream 24 typically has a CO2 partial pressure of 6-35 bar, preferably 20-30 bar. This partial pressure is satisfactorily lower than the design limit of any membrane(s) of downstream gas separation membrane-based separation stages. As a result, CO2 plasticization of such a membrane(s) is avoided.

In order to recover amounts of methane that slipped across the membrane(s) of the first separation unit 6, the compressed first permeate stream 24 is fed to a second gas separation membrane-based separation unit 32. The second gas separation unit 32 also includes a bank of one or more membranes selective for CO2 over methane. The second separation unit 32 produces, in comparison to the compressed first permeate stream 24, a second, CO2-enriched and methane-deficient permeate stream 34 and a second CO2-deficient and methane-enriched residue stream 36.

The second residue stream 36 is then compressed by one or more compressors of the multi-stage compression unit 22. It is important to note that the one or more compressors used to compress the first permeate stream 18 are different from those used to compress the second residue stream 36 even though they form part of the same multi-stage compression unit 22. The second residue stream 36 is compressed to a pressure sufficient for a downstream gas separation membrane-based separation unit to produce a residue stream at a pressure that allow such a residue stream to be combined with the stream of a mixture of CO2 and hydrocarbons 2 without requiring further compression of such a residue stream.

The compressed second residue stream 38 is then fed to a third gas separation membrane-based separation unit 40 that also includes a bank of one or more membranes that are selective for CO2 over methane. The third separation unit produces, in comparison to the second residue stream 36, a third CO2-enriched and methane-deficient permeate stream 42 and a third CO2-deficient and methane-enriched residue stream 4. Because the third residue stream 4 contains useful amounts of methane, it is recycled by combining it with the stream of a mixture of CO2 and methane 2 and, together with that stream 2, fed to the first separation unit 6.

While the second and third permeate streams 34, 42 do not contain significant amounts of methane, as a whole, they typically contain up to 95 mol % CO2, more typically up to 99 mol % CO2, and even as much as 99.9 mol % CO2. The combination of the second and third permeate streams 34, 42 may be disposed or, consumed in an onsite process, or further purified to produce product CO2 suitable for industrial or food-related uses.

Figure 4:
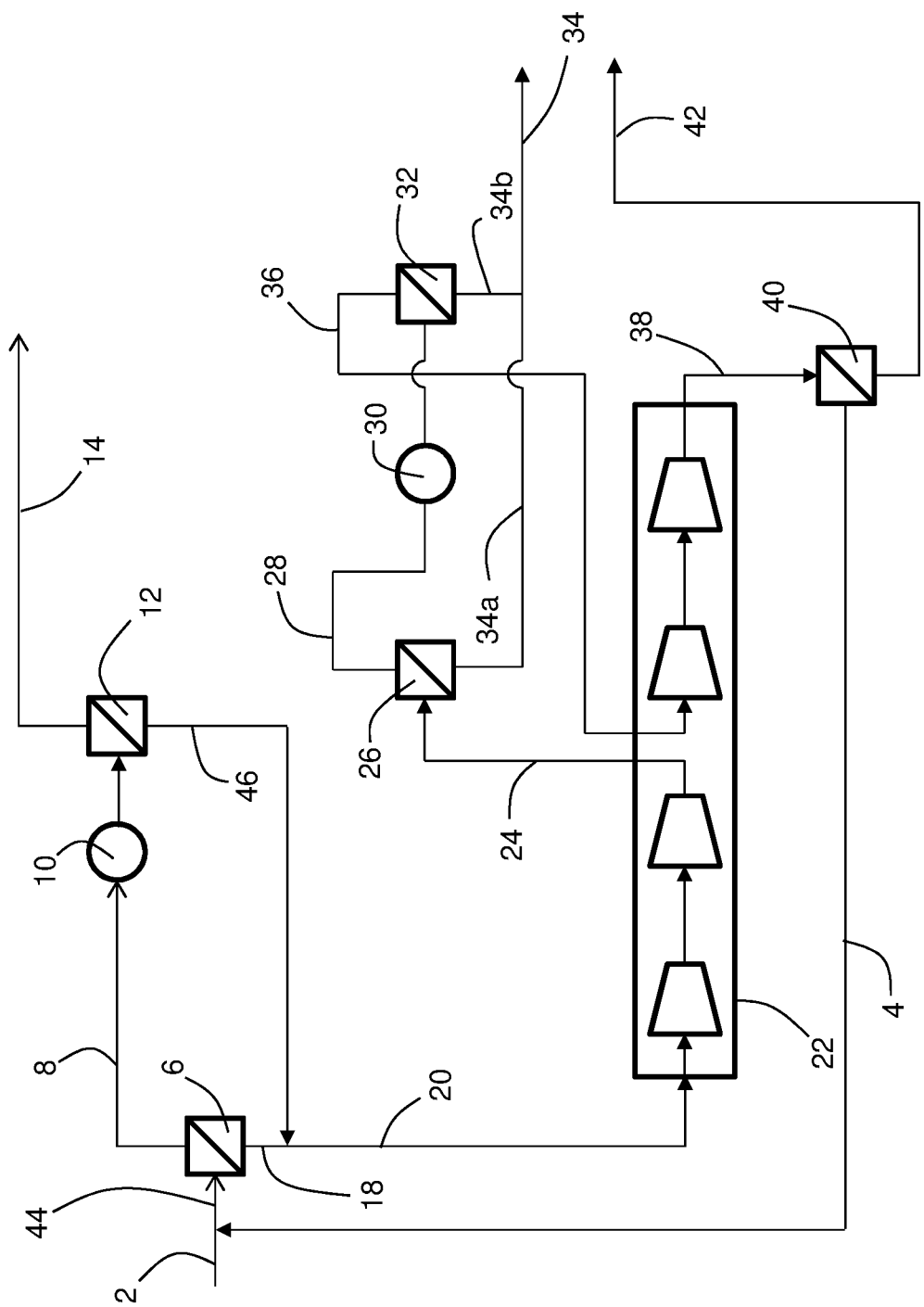
FIG. 4 is a schematic of another embodiment of the invention in which a single compressor is used to separately compress, on one hand, permeates from two in-series banks of membranes in a first stage, and on the other hand, retentate from a second of two in-series banks of membranes of a second stage.

In a second embodiment shown in FIG. 4, each of the first and second separation units includes two banks of gas separation one or more membranes that are arranged in series. A feed stream 44 is in part derived from a stream of a mixture of CO2 and methane 2. The feed stream 44 is fed to a first gas separation membrane-based separation stage, which includes first and second banks 6, 12 of one or more membranes that are selective for CO2 over methane. Typically, the feed stream 44 has a pressure of 30-100 bar. In comparison to the feed stream 44, the first stage produces a first, CO2-enriched and methane-deficient permeate stream 20 and a first, CO2-deficient and methane-enriched residue stream 14.

Each of the two banks 6, 12 in the first separation unit produces, in comparison to the associated gas fed to it, an associated permeate stream that is enriched in CO2 and deficient in methane and an associated residue stream that is deficient in CO2 and enriched in methane. Because the first separation unit includes two banks of gas separation membranes arranged in series, a residue stream 8 produced by the first bank 6 is fed to the second bank 12 (after optionally being heated in a heat exchanger 10 to a temperature above its dew point). The residue stream 14 produced by the second bank 12 is be withdrawn as product natural gas and may be optionally further treated to remove remaining impurities.

The stream 20 of a combination of the permeate streams 18, 46 produced by the first and second banks 6, 12 of the first separation unit are compressed in one or more compressors of a multi-stage compression unit 22 that includes a plurality of compressor stages arranged in series. For centrifugal compression-type compression units, typically there are 4 or 5 or 6 compressor stages arranged in series. For reciprocating-type compression units or screw-driven compression units, there may be 3-6 compressor stages arranged in series. While the permeate streams 18, 46 from the first separation unit are illustrated as being combined at a point upstream of introduction into the multi-stage compression unit 22, it is within the invention to separately feed those permeate streams 18, 46 to the multi-stage compression unit 44.

According to the invention, we have modified the use of an otherwise-conventional compression train so that it can be used to separately compress two different gases. Those skilled in the art will recognize that compression trains are typically used to compress a gas in each of the sequential compressors from low to medium to high pressure. For example, in a conventional 4-compressor compression unit, gas is sequentially compressed by the upstream-most compressor to a low pressure, compressed by the next upstream-most compressor to a moderately low pressure, compressed by the next upstream-most compressor to a moderate high pressure, and compressed by the downstream-most compressor to a high pressure.

Allow us to provide a contrasting example in practice of the invention while sticking to this 4-compressor compression unit example. In practice of the invention, the combination stream 20 of the permeate streams 18, 46 produced by the first and second banks 6, 12 would be sequentially compressed to a low pressure by the first compressor and this moderately low pressure gas is then fed to the second compressor where it is compressed to moderately low pressure using the second compressor. Instead of feeding the moderately low pressure gas to the third compressor and compressing it to a moderately high pressure (and thereafter to a high pressure with the fourth compressor), the moderately low pressure gas is instead subjected to a membrane purification process (described below) before the methane-enriched gas resulting from the membrane purification process is returned to the compression unit 22 and sequentially compressed by the third and fourth compressors.

Because it is more desirable to collect the product CO2 at relatively higher pressures without requiring compression thereof, it is advantageous to provide a suitably high pressure for the compressed combined stream 24 before it is further separated in any downstream gas separation membrane stages. Thus, the resulting pressure of the stream 24 of compressed, combined permeate streams 18, 46 is typically 40-95 mol % CO2, the compressed first permeate stream 24 typically has a CO2 partial pressure of 6-35 bar, preferably 20-30 bar. This partial pressure is satisfactorily lower than the design limit of any membrane(s) of downstream gas separation membrane-based separation stages. As a result, plasticization of such a membrane(s) is avoided.

In order to recover amounts of methane that slipped across the membrane(s) of the first separation unit, the compressed, combined stream 24 is fed to a second gas separation membrane-based separation unit that includes, arranged in series, first and second banks of one or more membranes arranged in series 26, 32. The second separation unit produces, in comparison to the compressed, combined stream 24, a second permeate stream 34 that is enriched in CO2 and deficient in methane and a second residue stream 36 that is deficient in CO2 and enriched in methane. More particularly, the compressed combined stream 24 is fed to the first bank 26 of the second separation unit. The residue stream 28 produced by the first bank 26 is fed to the second bank 32, optionally, after being heated in a heat exchanger 30 to a temperature above its dew point. The permeate streams 34a, 34b that are produced by the first and second banks 26, 32 of the second separation unit are combined as second permeate streams 34.

The second residue stream 36 is then compressed by one or more compressors of the multi-stage compression unit 22. It is important to note that the one or more compressors used to compress the second residue stream 36 are different from the compressors used to compress the first permeate stream 20 even though they form part of the same multi-stage compression unit 22. The second residue stream 36 is compressed to a pressure sufficient for a downstream gas separation membrane-based separation unit to produce a residue stream at a pressure that allow such a residue stream to be combined with the stream of a mixture of CO2 and hydrocarbons 2 without requiring further compression of such a residue stream.

The compressed second residue stream 38 is then fed to a third gas separation membrane-based separation unit 40 that includes one or more banks of one or more membranes in series or parallel. The third separation unit 40 produces, in comparison to the second residue stream 36, a third CO2-enriched and methane-deficient permeate stream 42 and a third CO2-deficient and methane-enriched residue stream 4. Because the third residue stream 4 contains useful amounts of methane, it is recycled by combining it with the stream of the mixture of CO2 and methane 2, together with that stream 2, fed to the first separation unit 6.

While the permeate streams 34, 42, produced by the second and third separation units do not contain significant amounts of methane, as a whole, they typically contain up to 95 mol % CO2, more typically up to 99 mol % CO2, and even as much as 99.9 mol % CO2. The combination of these permeate streams 34, 42 may be disposed or, consumed in an onsite process, or further purified to produce product CO2 suitable for industrial or food-related uses. It should be noted that, while the permeates 34a, 34b produced by the first and second banks 26, 32 of the second separation unit are illustrated as being combined as stream 34, they need not be combined.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of removing amounts of $CO_2$ from $CO_2$/hydrocarbon mixtures, said method comprising the steps of:
    feeding a feed stream, comprising $CO_2$ and hydrocarbons, to a first gas separation membrane-based separation unit comprising one or more banks of one or more membranes arranged in parallel or in series that are selective for $CO_2$ over methane to produce, in comparison to a $CO_2$ content of the feed stream, a first $CO_2$-enriched permeate stream and a first $CO_2$-deficient residue stream;
    withdrawing the first $CO_2$-deficient residue stream from the first gas separation membrane-based seperation unit as product natural gas;
    compressing the first $CO_2$-enriched permeate stream in one or more compressors of a multi-stage compression unit comprising a plurality of compressors arranged in series to produce a compressed stream of the first $CO_2$-enriched permeate stream;
    feeding the compressed stream of the first $CO_2$-enriched permeate stream to a second gas separation membrane-based separation unit comprising one or more banks of one or more membranes arranged in parallel or in series that are selective for $CO_2$ over methane to produce, in comparison to the compressed stream of the first $CO_2$-enriched permeate stream, a second $CO_2$-enriched permeate stream and a second $CO_2$-deficient residue stream;
    compressing the second $CO_2$-deficient residue stream in one or more compressors of the multi-stage compression unit to produce a compressed second residue stream, the one or more compressors used to compress the first $CO_2$-enriched permeate stream being different from the one or more compressors used to compress the second $CO_2$-deficient residue stream;
    feeding the compressed second residue stream to a third gas separation membrane-based separation unit comprising one or banks of one or more membranes that are selective for $CO_2$ over methane to produce, in comparison to the second $CO_2$-deficient residue stream, a third $CO_2$-enriched permeate stream and a third $CO_2$-deficient residue stream;
    withdrawing the second and third $CO_2$-enriched permeate streams as one or more streams of product $CO_2$; and
    combining the third $CO_2$-deficient residue stream with a stream of a mixture of $CO_2$ and hydrocarbons, to produce the feed stream, the mixture of $CO_2$ and hydrocarbons including methane.

2. The method of claim 1, wherein the stream of a mixture of $CO_2$ and hydrocarbons is raw natural gas that has been partially treated.

3. The method of claim 1, wherein a pressure of the stream of a mixture of $CO_2$ and hydrocarbons ranges from 30-100 bar.

4. The method of claim 1, wherein the stream of a mixture of $CO_2$ and hydrocarbons comprises 30-80 mol % $CO_2$.

5. The method of claim 1, wherein the product natural gas comprises at most 20 mol % $CO_2$.

6. The method of claim 1, wherein the one or more compressors are driven with a single drive.

* * * * *